United States Patent [19]
Inukai et al.

[11] Patent Number: 6,013,214
[45] Date of Patent: Jan. 11, 2000

[54] METHOD FOR MANUFACTURING FILTER ELEMENT

[75] Inventors: Satoshi Inukai, Chita-gun; Ichihiro Kato, Okazaki; Takeharu Maekawa, Chita-gun, all of Japan

[73] Assignee: Denso Corporation, Japan

[21] Appl. No.: 08/969,451

[22] Filed: Nov. 13, 1997

[30] Foreign Application Priority Data

Jan. 23, 1997 [JP] Japan .................................... 9-009977

[51] Int. Cl.[7] .............................. B29C 39/04; D21J 3/00; D21J 7/00
[52] U.S. Cl. ........................... 264/87; 162/219; 162/224; 162/227; 162/228; 162/387; 162/404; 162/416; 264/279
[58] Field of Search .................. 264/86, 87, 275, 264/279, 279.1; 249/141; 425/84, 85, 405.1; 162/218, 219, 227, 228, 224, 226, 387, 396, 403, 404, 406, 416

[56] References Cited

U.S. PATENT DOCUMENTS 3,719,553  3/1973  Dorril et al. .
4,349,326  9/1982  Foster et al. .
4,753,713  6/1988  Gunderson .
4,853,087  8/1989  Schlor et al. .
4,971,746  11/1990  Ferrer .
5,755,963  5/1998  Sugiura et al. ...................... 210/493.1

FOREIGN PATENT DOCUMENTS

0755710 A1  1/1997  European Pat. Off. .
54-30575  3/1979  Japan .
60-64612  4/1985  Japan .

*Primary Examiner*—Karen Aftergut
*Attorney, Agent, or Firm*—Nixon & Vanderhye PC

[57] ABSTRACT

In a filter manufacturing method, during a time period from the start of the suction of the slurry to a point in time when fibers in the slurry accumulate on the outer peripheral surface of the protector to a prescribed thickness, the protector and its leg portions are held spaced away from each other. The leg portions are moved toward the protector so that the leg portions are disposed at a position spaced by a uniform distance from the outer peripheral surface of the protector and the suction operation is continued. Thus, the slurry containing the fibers therein can be easily caused to flow deeply into recess portions of a fin-like portion with no fiber being caught between the protector and the leg portions, thus reducing non-walled portions.

20 Claims, 7 Drawing Sheets

METHOD FOR MANUFACTURING FILTER
ELEMENT

BACKGROUND OF THE INVENTION

1. Field of the Invention

The present invention relates to a method for manufacturing a filter element having a number of concavities and convexities on an outer peripheral surface thereof by suction molding, and a molding die for use therein.

2. Description of Related Art

Figure 11:
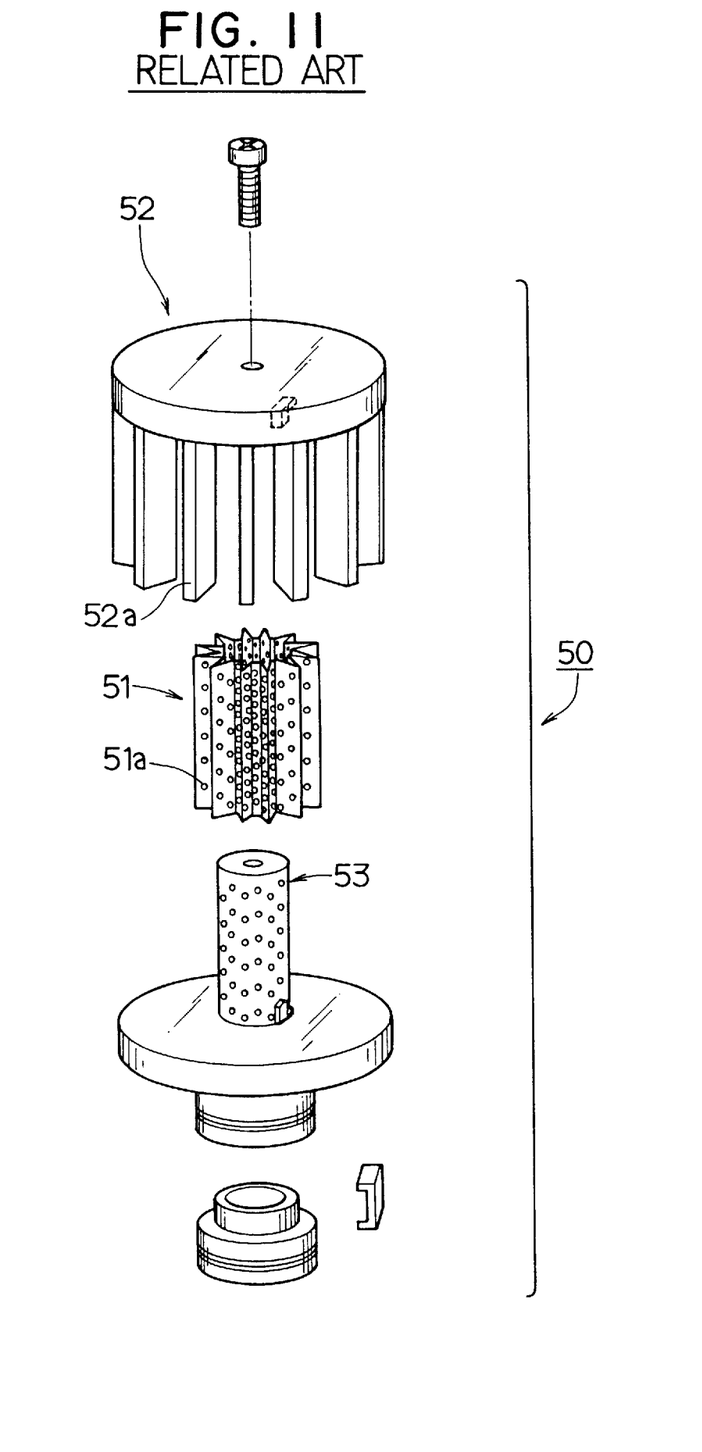
FIG. 11 is an exploded perspective view illustrating a suction jig used in a related art.
Figure 12:
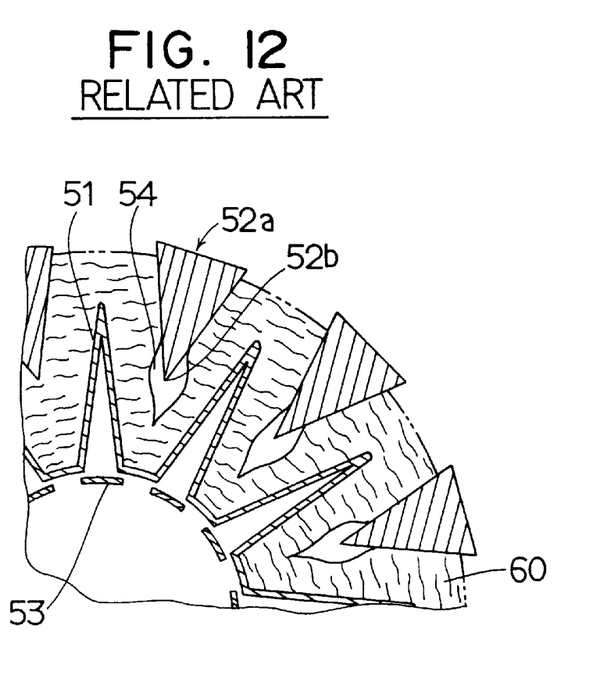
FIG. 12 is a sectional view illustrating a molded body manufactured in the related art.

It is proposed in U.S. Pat. No. 5,755,963 (EP 0755710 A1) to manufacture by suction molding a filter element having a plurality of fin-like portions formed on an outer peripheral surface thereof. In this method, as illustrated in FIGS. 11 and 12, there is used as a molding die a suction jig 50 that is composed of a protector 51 having a number of suction openings 51a formed therein and defining an inner peripheral configuration of a molded body 60 and a contouring jig 52 defining an outer peripheral configuration of the molded body 60, whereby a slurry containing therein fibers used as filter material is sucked and molded via a suction core 53 assembled to the inside of the protector 51 to thereby form the molded body 60. The contouring jig 52 has a plurality of leg portions 52a disposed in such a way as to oppose the concavities of the protector 51 and gaps permitting the passage of the fibers therethrough are formed between these leg portions 52a. By causing the slurry containing the fibers therein to flow in from between the leg portions 52a and thereby causing the fibers to be accumulated there is suction molded the molded body 60 having a plurality of fin-like portions formed on the outer peripheral surface thereof.

However, in the case of this manufacturing method, there remains a likelihood that when the slurry containing fibers therein is sucked via the protector 51 and flowed in from between the leg portions 52a, the fibers contained in the slurry might be caught between the leg portions 52a and the protector 51, especially, in the vicinity of forward end portions 52b of the leg portions 52a, whereupon the fibers contained in the slurry sequentially sucked are hindered from flowing toward the protector 51 by the fibers which has thus been caught. As a result, it is likely that, as illustrated in FIG. 12, non-walled portions 54 may be formed in part of the molded body 60.

SUMMARY OF THE INVENTION

It is an object of the present invention to provide a method for manufacturing a filter element which has less non-walled portions.

It is another object of the present invention to provide a die suitable for the manufacturing method.

According to the present invention, during a time period from the start of the suction of a slurry to a point in time when a filter material is accumulated to a prescribed thickness on the outer peripheral surface of a first molding die member, a second molding die member is disposed at a second position more remote from the outer peripheral surface of the first molding die member than a first position. Thus, the slurry can flow deeply into the concavities of the first molding die member without filter material contained in the slurry being caught between the first molding die member and the second molding die member. For this reason, it is possible to suppress the occurrence of non-walled portions at deep positions of the concavities of the first molding die member.

BRIEF DESCRIPTION OF THE DRAWINGS

Other objects, features and advantages of the present invention will become more apparent from the following detailed description which is made with reference to the accompanying drawings. In the drawings.

DETAILED DESCRIPTION OF THE PREFERRED EMBODIMENT

An embodiment of the present invention will now be explained with reference to FIGS. 1 to 8.

Figure 3:
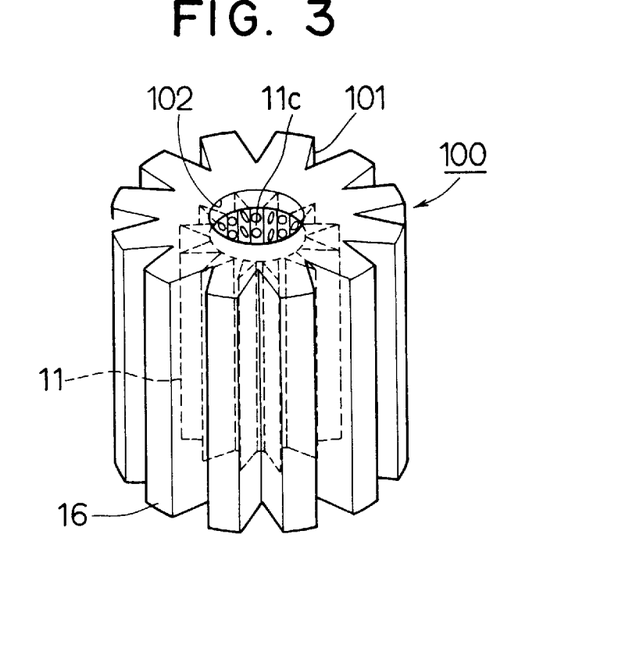
FIG. 3 is a perspective view illustrating a filter element (molded body) manufactured with the suction jig of FIGS. 1 and 2.

A filter element 100 which is cylindrical in configuration as illustrated in FIG. 3 has on an outer peripheral surface thereof a number of axially extending fin-like portions 101 (composed of concavities and convexities) and may be used as an oil filter for filtering a lubricating oil of, for example, an internal combustion engine. In both top and bottom end surfaces of the filter element 100 central holes 102 are open, respectively, and the central hole 102 at one end thereof serves as a sucking-out port which is connected to a housing (not illustrated) when the filter element 100 is accommodated within the housing as an oil filter while, on the other hand, the central hole 102 at the other end thereof is closed by a relief valve (not illustrated). It is to be noted that inside the filter element 100 there is formed a space having a star-shaped cross section corresponding to the configuration of a protector 11.

Figure 4:
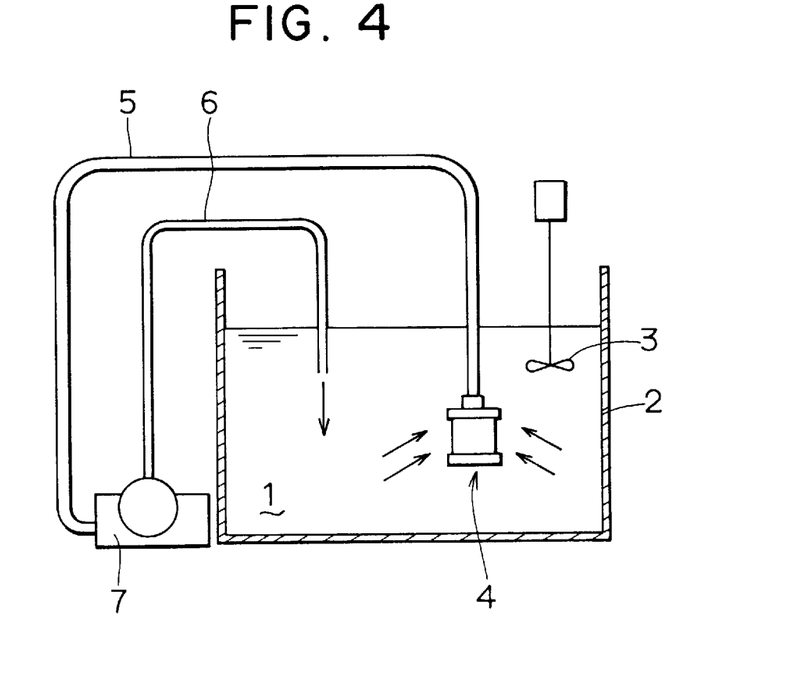
FIG. 4 is a schematic view illustrating an entire suction/molding apparatus used in this embodiment.

The above-described filter element 100 is formed using a suction molding apparatus illustrated in FIG. 4.

The suction apparatus comprises a water tank 2 having received therein a water slurry 1 containing fibers used as filter material, an agitator 3 for agitating the slurry 1 within this water tank 2, a suction jig 4 (molding die) for sucking the slurry 1 within the water tank 2 and thereby forming a molded body 16, and a suction pump 7 for sucking the slurry 1 through a suction hose 5 connected to this suction jig 4 and returning the slurry 1 into the water tank 2 through a discharge hose 6. It is to be noted that as the fibers used as filter material of an oil filter there are polyester useful for obtaining the oilproof strength, acryl useful for obtaining the filtering performance, pulp enabling the reduction in cost, etc.

The suction jig 4 comprises a circular base portion 9 having a connection pipe 8, a hollow cylindrical suction core 10 assembled to the base portion 9, a protector 11 mounted onto an outer periphery of the suction core 10 and serving as a first molding die member and a contouring jig 12 used in combination with the protector 11 and serving as a second molding die member.

To the connection pipe 8 there is connected at an open end thereof a suction hose 5 via a joint 13. The joint 13 is fixed to the connection pipe 8 by means of a stopper 14, provided, however, that the joint 13 is connected so that the connection pipe 8 and the suction pipe 5 are held relatively rotatably.

The suction core 10 has a number of suction openings 10a formed substantially uniformly over an entire region thereof. It is to be noted that it may be arranged that the porosity of the suction openings 10a may increase by the number of the suction openings 10a being increased in the axial direction of the suction core 10 from the base portion 9 toward a side opposite thereto (from the downside to the upside in FIGS. 1 and 2).

A forward or top end of the suction core 10 is closed and has formed therein a hole into which a jig fixing bolt 15 is screwed. By this bolt 15, the protector 11 and the contouring jig 12 are fixed to the base portion 9, whereby the suction jig 4 is assembled.

The protector 11 which may be made of stainless steel having excellent corrosion resistance and is shaped like a hollow cylindrical star in cross section and opened at its both ends. The protector 11 has a number of suction openings 11a in a wall surface thereof. It is to be noted that the size of the suction opening 11a is set at a value enabling fibers to be filtered from the slurry 1. Also, the suction openings 11a are formed in the wall surface of the protector 11 with such a density as to cause no undesirable pressure loss during the suction molding time period. It is to be noted that the protector 11 has prescribed rigidities in its axial and radial directions.

The protector 11 is a member which defines an inner peripheral configuration of the filter element 100, i.e., which in the case of an oil filter defines the configuration on a clean side. It is substantially shaped like a hollow cylinder. The protector 11 has formed on an outer surface thereof a plurality of convexities 11b1 extending along the longitudinal axis thereof and in the radially outward direction thereof and a plurality of substantially V-shaped grooves (concavities or recesses) 11b2 defined between the convexities 11b1. Thus, the outer surface of the protector 11 has the fin-like portions 11b.

In the central part of the protector 11 there is defined a circular, columnar central space 11c enabling the suction core 10 to be received therein. A plurality of triangular, columnar fin-like spaces lid are defined by the fin-like portions 11b in such a way as to radially spread from this central space 11c. On the other hand, in the both end surfaces of the protector 11 as viewed in the axial direction thereof there are formed the central hole 102 having a substantially circular contour and fin portion openings corresponding to the fin-like portions 11b. These fin portion openings are gaps which enable fibers to be filtered from the slurry 1.

It is to be noted that although the protector 11 may be worked so as to make the gaps of the fin portion openings narrow or close these gaps, in order to close the central hole 102 by contact between the protector 11 and another member in a succeeding step it is important that the fibers be accumulated over an entire outside circumference of the central hole 102 and that, therefore, it be arranged that the fibers is accumulated also on the openings of the fin-like portions 11b. Also, by forming the central holes 102 in both end surfaces of the protector 11, it is possible to use one of the two as the outlet of an oil filter and mount a relief valve thereof on the other of the two.

At the foot of the suction core 10 on the base portion 9 there is provided a pedestal 9a composed of a spacer portion 9b which when the protector 11 has been assembled to the suction core 10 abuts against a lower end surface of the protector 11 to thereby ensure the maintenance of a prescribed gap between the lower end surface of the protector 11 and the base portion 9 and a stopper portion 9c which engages the fin-like portions 11b of the protector 11 to thereby prevent the rotation of the protector 11. By the prescribed gap being ensured between the lower end surface of the protector 11 and the base portion 9 by the spacer portion 9b, it is possible to accumulate the fibers on the lower end surface of the protector 11 in a suction process as later described. Since the fin portion openings at the lower end surface of the protector 11 will be closed by the fibers, the surface of the base portion 9 on the side of the protector 11 constitutes a part of the contouring jig 12 for defining the outer configuration of the molded body 16 prepared by the fibers being accumulated in the above-mentioned gap.

The contouring jig 12 is a member for defining the outer configuration of the filter element 100, the configuration of the oil filter on the dusty side in this embodiment. The contouring jig 12 is equipped with a retaining portion 12a assembled to the protector 11 and a plurality of leg portions 12b rotatably mounted on the retaining portion 12a.

A surface of the retaining portion 12a which when the contouring jig 12 is assembled to the protector 11 is on the side of the protector 11 has thereon a pedestal 12c corresponding to the pedestal 9a of the base portion 9. The pedestal 12c has a spacer portion 12d which when the contouring jig 12 is assembled to the protector 11 abuts against an upper end surface of the protector 11 to thereby ensure the maintenance of a prescribed gap between the upper end surface of the protector 11 and the retaining portion 12a and a stopper portion 12e which engages the fin-like portions 11b of the protector 11 to thereby prevent the rotation of the protector 11. The surface of the retaining portion 12a on the side of the protector 11 has a smooth surface and defines the outer configuration of the fibers accumulated in the gap between the protector 11 and the retaining portion 12a. That is, the configuration of the top end surface of the filter element 100 is defined by the retaining portion 12a.

A plurality of substantially triangular, columnar leg portions 12b are mounted at one bottom end surface of the retaining portion 12a and are arranged to rock or swing in a radial direction by driving means (e.g., an electric motor, link mechanism, etc.) about the end portions thereof mounted to the retaining portion 12a. It is arranged that by being rocked, each leg portion 12b can be moved between a first position (FIG. 2) spaced by a prescribed uniform distance from the outer peripheral surface of the protector 11 and a second position (FIG. 1) more remote from this outer peripheral surface thereof than the first position. It is to be noted that when disposed at the first position, the leg portion 12b is mounted to the retaining portion 12a so that a forward or radially inside end portion 12b1 thereof may be located at the position of its opposing groove portion 11b2 of the protector 11.

When the leg portion 12b is disposed at the first position (FIG. 2), between the adjacent two of the leg portions 12b there is formed a gap whose size permits the fibers in the slurry to freely pass therebetween. When the slurry 1 is sucked, the slurry 1 flows from a substantially entire circumference of the radially outer peripheral side of the protector 11 toward this protector 11, with the result that it is possible to obtain a uniform fiber orientation and also to shorten the sucking period of time.

The manufacturing process of the filter element 100 by the use of the suction die 4 will be explained next.

The fibers which are previously finely severed by a mixer (not illustrated) or the like are introduced into the water tank 2 jointly with binder fibers (thermofusible fibers) used as reinforcing material of the filter element 100. Then, the resulting water slurry 1 is agitated by the agitator 3 for dispersion of the contents thereof to thereby make the fiber concentration thereof uniform.

Figure 5:
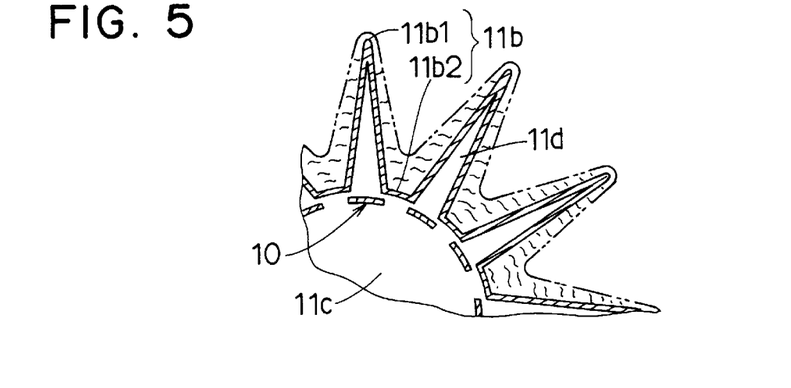
FIG. 5 is a sectional view schematically illustrating a state where fibers are accumulated on an outer peripheral surface of a protector when the leg portions are disposed at the second position.
Figure 6:
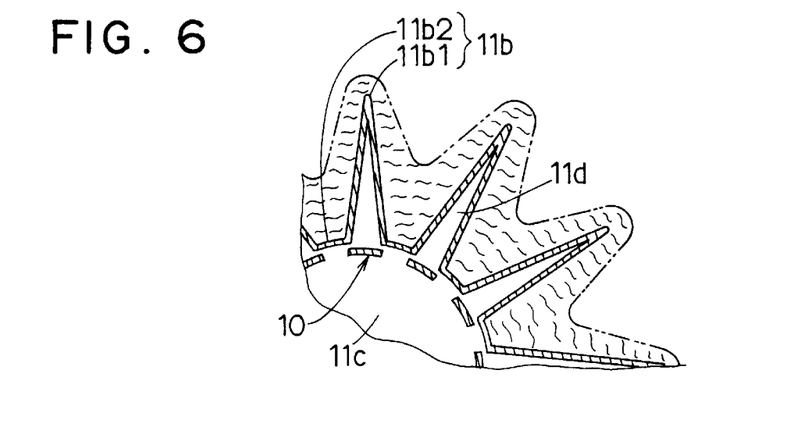
FIG. 6 is a sectional view schematically illustrating a state where the fibers are accumulated on the outer peripheral surface of the protector, that is immediately before the leg portions are moved to the first position.

Subsequently, the suction jig 4 is immersed in the slurry 1 and then the suction pump 7 is operated, whereby the suction molding is performed. This suction molding step is executed by, while rotating the suction jig 4, adjusting the amount of the slurry sucked in by the suction pump 7. As a result, the slurry 1 in the water tank 2 flows through the suction jig 4→suction hose 5→suction pump 7→discharge hose 6 and again flows back to the water tank 2, whereby the slurry 1 circulates. When the sucked slurry 1 passes through the suction openings 11a formed in the protector 11, the fibers contained in the slurry 1 attach onto the outer peripheral surface of the protector 11 without passing through the suction openings 11a. Further, the fibers contained in the slurry 1 are sequentially accumulated on the fibers having attached onto the outer peripheral surface of the protector 11 as shown in FIGS. 5 and 6.

Figure 1:
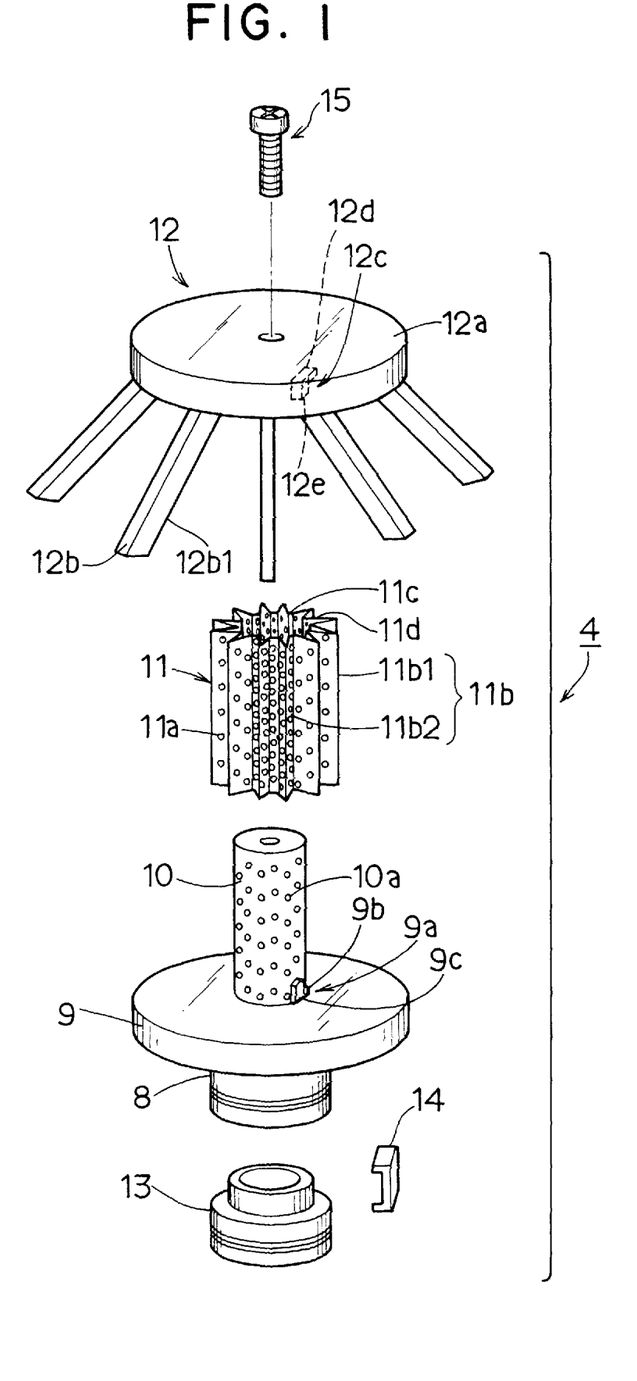
FIG. 1 is an exploded perspective view illustrating a state of a suction jig when its leg portions are located at a second position in one embodiment of the present invention.

Meanwhile, during a time period of from the point in time when the suction pump 7 has started to operate and suck the slurry 1 to the point in time when a prescribed time length has thereafter lapsed, the leg portion 12b of the contouring jig 12 is disposed at the second position. As illustrated in FIG. 1, the bottom ends of the leg portions 12b are in an open state (second position) of their having been moved in the direction of their radially going away from the protector 11, i.e., in a state of their having been opened as if an umbrella has been opened. Therefore, the slurry 1 can be caused to flow into a deep position of the groove portion 11b2 of the protector 11 with no fiber contained in the slurry 1 being caught between the leg portions 12b and the protector 11. For this reason, the fibers can be accumulated without causing the occurrence of a non-walled portion in the groove portion 11b2 of the protector 11.

Figure 2:
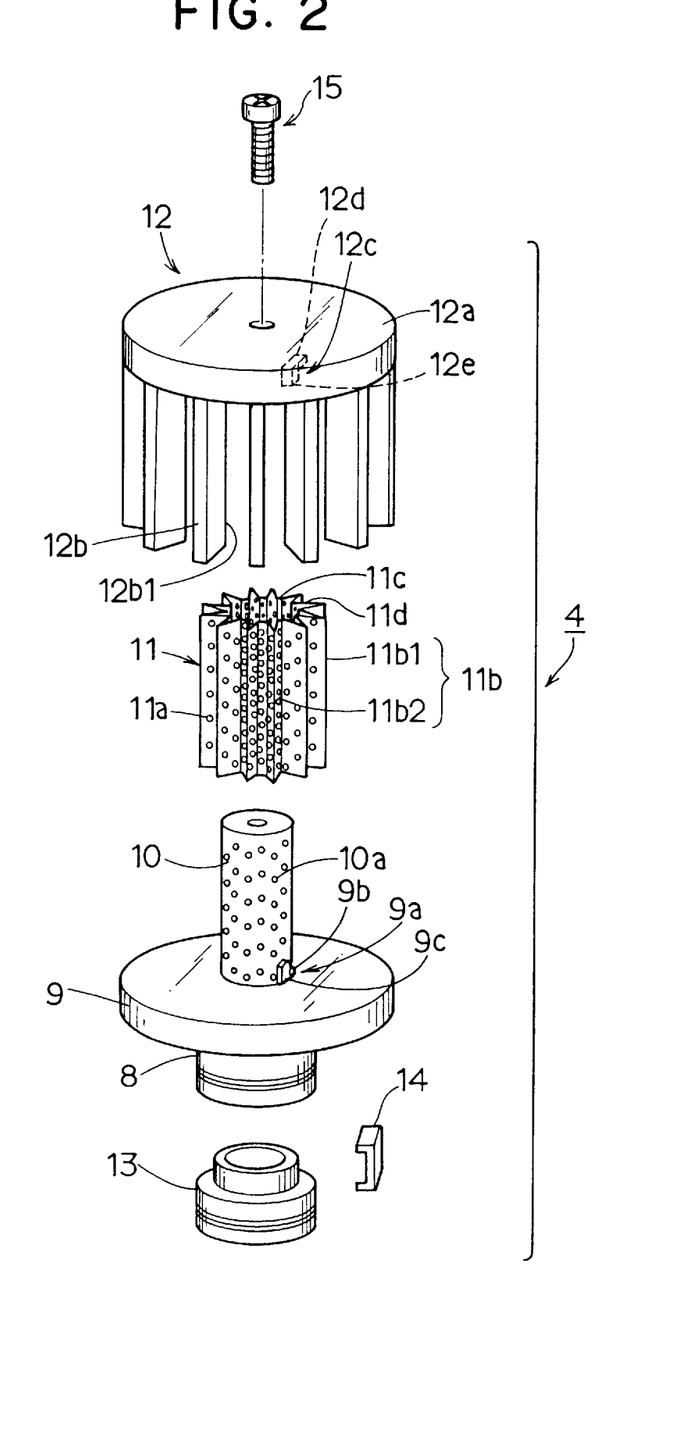
FIG. 2 is an exploded perspective view illustrating a state of the suction jig of FIG. 1 when its leg portions are located at a first position.
Figure 7:
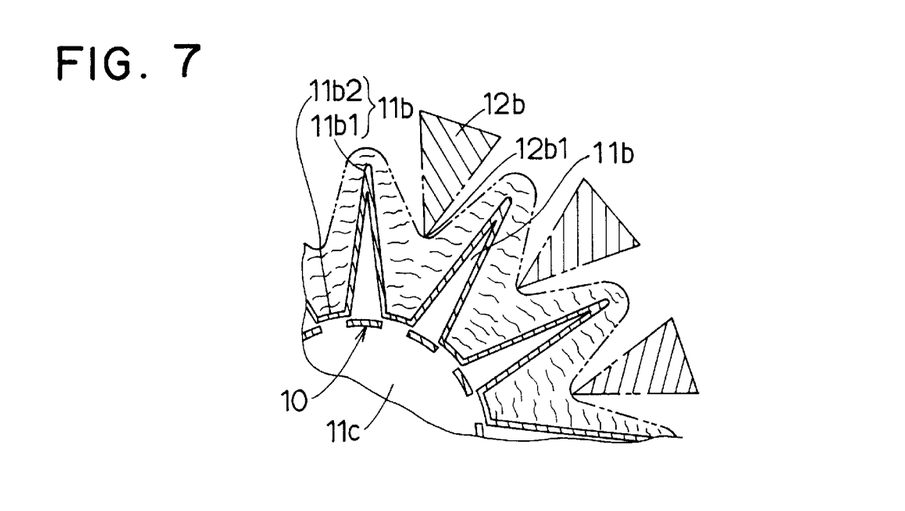
FIG. 7 is a sectional view schematically illustrating a state where the fibers are accumulated on the outer peripheral surface of the protector, that is immediately after the leg portions are moved to the first position.

When, after the suction pump 7 starts to operate, a prescribed time period lapses and a prescribed amount (preferably 10 to 70% of the whole filter material, more preferably 20 to 40% thereof) of fibers is accumulated whereby the thickness of the accumulated filter material becomes a prescribed value, the leg portions 12b of the contouring jig 12 having theretofore been in the second position (opened state in FIG. 1) are moved toward the protector 11. Then, as illustrated in FIG. 2, the forward end portion 12b1 moved radially inward to be disposed vertically in the groove portions 11b2 of the protector 11, with the result that the leg portions 12b are brought to a state of their having been disposed at a position (first position) spaced by the prescribed uniform distance from the outer peripheral surface of the protector 11, i.e., to a state of their having been closed as if an umbrella has been closed as shown in FIG. 7.

Figure 8:
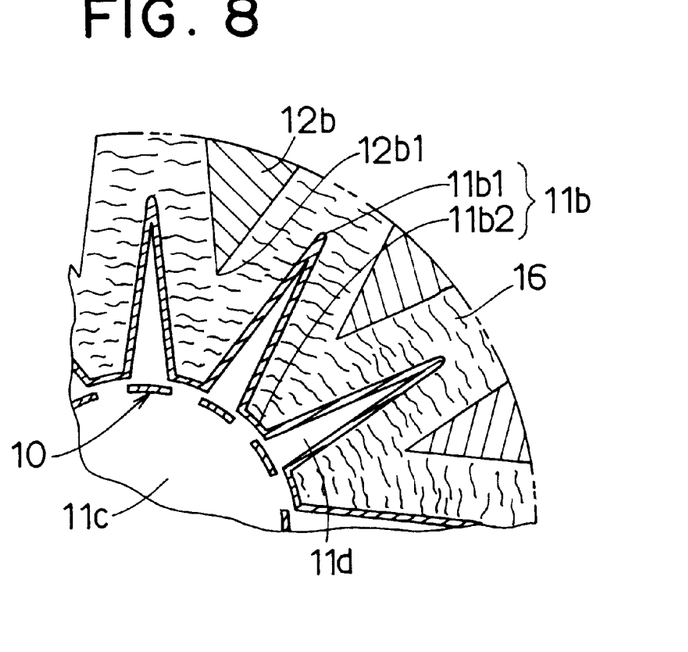
FIG. 8 is a sectional view schematically illustrating a state where the fibers are accumulated on the outer peripheral surface of the protector when the leg portions are located at the first position.

By further continuing the suction molding operation, the slurry 1 flows into the protector 11 and the leg portions 12b, whereby the fibers contained in the slurry 1 are further accumulated on the outer peripheral surface of the protector 11. As a result, in the space between the protector 11 and the contouring jig 12 there is formed the hollow, cylindrical molded body 16 having a number of fin-like portions 101 on an outer peripheral surface thereof and star shaped in cross section with a generally uniform wall thickness as shown in FIG. 8. It is to be noted that the fibers are accumulated on both the top and bottom end surfaces of the protector 11 as well as between the protector 11 and the leg portions 12b, whereby the fibers are accumulated on the entire outer periphery of the protector 11.

After the completion of the suction molding operation, the molded body 16 is taken out from the suction jig 4 together with the protector 11 and is subjected to dehydration treatment. Subsequently, the binder resin (e.g., thermohardening resin such as water dispersible phenol resin) which has been dispersed in water and thereby made colloidal and has had positive charges imparted thereto is impregnated into the molded body 16, after which the resulting molded body is heated at a prescribed temperature and thereby dried to harden the binder resin.

It is to be noted that the water dispersible phenol resin has the following characteristics.

| | |
|---|---|
| outlook | white or light brown emulsion |
| nonvolatility | 39–41% |
| viscosity | 300–800 cps/25° C. |
| pH | 4.7–5.1 |
| specific gravity | 1.10–1.14 |
| free formaldehyde | less than 2.5% |
| free phenol | less than 2.5% |
| dispersibility | stably dispersible in water |
| particle charge | cation |

Through the execution of the above-described respective steps, there completes the filter element 100 such as that illustrated in FIG. 3 which has on the outer peripheral surface thereof a number of fin-like portions 101.

According to the method for manufacturing the filter element 100 in this embodiment, during the time period of from the start of the suction molding operation to the point in time when a prescribed time length thereafter lapses, the leg portions 12b of the contouring jig 12 are in a state of their being opened and are disposed at the position (second position) spaced away from the protector 11. Therefore, the slurry 1 can be caused to flow into a deep or bottom position of the groove portion 11b2 of the protector 11 with no fiber contained in the slurry 1 sucked by the suction pump 7 being caught between the leg portions 12b and the protector 11. For this reason, the fibers can be accumulated on the outer peripheral surface of the protector 11 without causing the occurrence of a non-walled portion.

Also, in this embodiment, after the prescribed time length lapses from the start of the suction of the slurry 1 and the fibers have been accumulated in this prescribed time length on the outer peripheral surface of the protector 11 to a prescribed thickness, the leg portions 12*b* are moved toward the protector 11 and thereby are disposed at the first position. Whereby, the slurry 1 is caused to flow into between the protector 11 and the contouring jig 12. By performing the suction molding operation in this way, the configuration of the outer peripheral surface of the molded body 16 is formed. For this reason, it is possible to prevent the fibers accumulated on the protector from being pulled with the result that the thickness of the filter material at the regions becoming the convexities of the fin-like portions becomes inconveniently small as in the case of forming the outer peripheral configuration of the molded body by, after accumulating the fibers on the protector, pressing the leg portions against the outer peripheral surface of the accumulated fibers. Thus, it is possible to manufacture the molded body 16 whose filter material has a prescribed thickness.

Also, in this embodiment, as the binder resin impregnated into the molded body 16 after this molded body has been formed, there is used water dispersible thermohardening resin which is stably dispersed in water. For this reason, the solvent for the slurry 1 and the solvent for the binder resin can be made common to each other. Accordingly, it is possible to perform the resin impregnation in succession to the forming of the molded body 16 by the suction molding operation without drying the molded body once thereafter. Therefore, it is possible to omit the step of, after forming the molded body 16, drying this molded body once, which step is needed when using, for example, organic solvent such as methanol as the solvent for the binder resin. Thus, it is possible to simplify the manufacturing process.

Meanwhile, when the binder resin is impregnated into the molded body 16 and thereafter the resulting molded body 16 is dried, the solvent of the binder resin is evaporated from the surface of the filter element 100 and so is moved to the surface thereof. In this embodiment, since positive charges are imparted to the binder resin impregnated into the molded body 16, it is possible to increase the adsorption force between the binder resin and the fibers having negative charges. Therefore, when impregnating the binder resin into the molded body 16 and thereafter drying the resulting molded body 16, only the water which is the solvent of the binder resin can be moved to the surface of the filter element 100, with the result that it is possible to prevent the blockade of the opening portions of the filter element 100 due to the movement of the binder resin to the surface of the molded body 16.

Although in the above-described embodiment, after the prescribed time length lapses from the start of the operation of the suction pump 7 and the fibers contained in the slurry 1 has been thereby accumulated in a prescribed amount based on the total amount of the fibers contained therein, the leg portions 12*b* are moved toward the protector 11 whereby the suction of the slurry 1 is subsequently performed. Alternatively, the formation of the molded body may be performed with the use of a method which comprises preparing beforehand a slurry containing a prescribed amount of fibers and performing the suction molding operation, moving the leg portions toward the protector side, and causing the suction of a slurry containing the remaining amount of fibers which has been prepared in a separate water tank.

Also, although in the above-described embodiment the configuration of the outer peripheral surface of the molded body 16 is defined using the contouring jig 12 whose leg portions 12*b* are rockably or swingably mounted at one end on the retaining portion 12*a,* there may be used a contouring jig whose plural leg portions disposed so as to surround the outer peripheral surface of the protector are moved toward the protector side in the radial direction of the molded body with both of its top and bottom ends moving equally.

Figure 9:
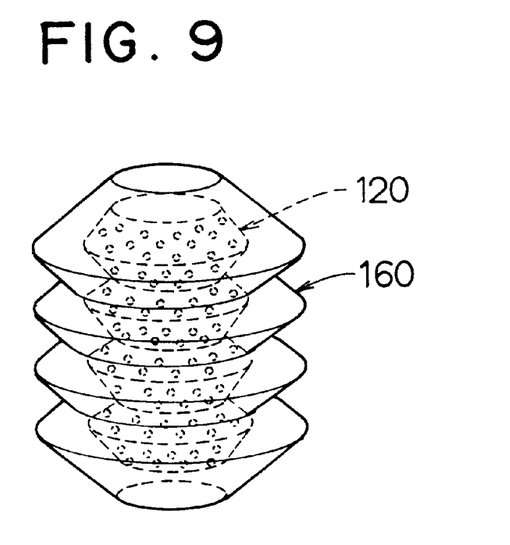
FIG. 9 is a perspective view illustrating a filter element (molded body) according to a modification of the embodiment.
Figure 10:
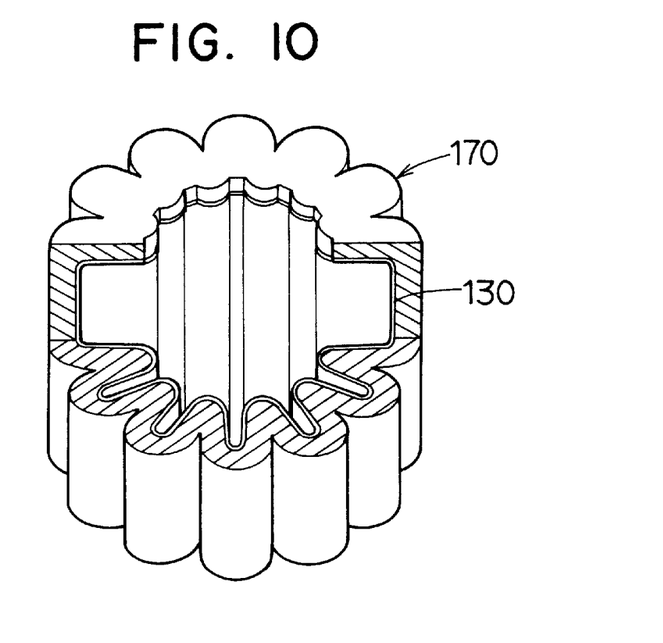
FIG. 10 is a perspective view illustrating the filter element (molded body) partly including a section thereof according to the modification of the embodiment.

Further, although in the above-described embodiment the filter element 100 is manufactured to have a plurality of the fin-like portions 101 formed in the axial direction thereof, the method may be applied to other filter elements having a plurality of concavities and convexities on the outer peripheral surface thereof. For example, it is also possible to manufacture a filter element (molded body) 160 having a plurality of fin-like portions formed in a direction substantially perpendicular to the axial direction thereof by the use of a bellows-shaped protector 120 such as that illustrated in FIG. 9. Further, it is also possible to manufacture a filter element (molded body) 170 having a plurality of concavities and convexities formed on the outer peripheral surface thereof by the use of a petal-shaped protector 130 called "a daisy type" such as that illustrated in FIG. 10. Also, it is possible to manufacture a spherical filter element (molded body) having a plurality of concavities and convexities formed on the outer peripheral surface thereof by the use of not a cylindrical protector but a spherical protector having a plurality of concavities and convexities formed on the outer peripheral surface thereof.

Further, although in the above-described embodiment the slurry 1 is suction molded to thereby form the molded body 16 and thereafter the binder resin dispersed in water is impregnated into this molded body 16, in the case of using the water dispersible resin as the binder resin there may be used as a slurry suction molded by the suction jig a slurry obtained by blending the binder resin thereinto together with the filter material and reinforcing material and preparing the resulting mixture. By using such a slurry, it is possible to simultaneously perform the suction molding and the resin impregnation.

Also, as the solvent for the binder resin there may be used thermohardening resin having an organic solvent property. However, in this case, since the solvent of the slurry and the solvent of the binder resin differ from each other, it is necessary to dry the molded body before the impregnation of the binder resin into this molded body.

Although in the above-described embodiment the filter element 100 has the fin-like portions 101 whose concavities and convexities are substantially V-shaped in cross section and the molding die for use therein, the cross-sectional configuration of the concavities and convexities formed on the outer peripheral surface of the filter element (molded body) manufactured by the above-described manufacturing method and molding die may be one having a flat bottom surface. Also, although in the above-described embodiment the filter element has concavities each of which is shaped like a groove, the present invention is not limited to the method for manufacturing the filter element whose concavities are each shaped like a groove and the molding die for use therein. That is, if the manufacturing method of the filter element is one directed to manufacturing the filter element having a number of concavities and convexities formed on the outer peripheral surface thereof, the present invention can be applied thereto and the cross-sectional configuration and the configuration of a plurality of concavities and convexities formed on the outer peripheral surface of the molded body and filter element are not limitative in particular.

Other modifications and alterations are also possible without departing from the spirit of the invention.

What is claimed is:

1. A method for manufacturing a filter element, the method comprising the steps of:

sucking a water slurry containing filter material through a first molding die member having a number of suction openings formed therein and having a plurality of concavities and convexities formed in an outer peripheral surface thereof;

causing the filter material to be accumulated between the first molding die member and a second molding die member disposed to oppose the concavities of the first molding die member and disposed at a first position spaced by a prescribed distance from the outer peripheral surface of the first molding die member so that a molded body having a number of concavities and convexities on an outer peripheral surface thereof is formed on the outer peripheral surface of the first molding die member, wherein the causing step disposes, during a time period from a start of the suction of the slurry to a point in time when the filter material is accumulated to a prescribed thickness on the outer peripheral surface of the first molding die member, the second molding die member at a second position more remote from the outer peripheral surface of the first molding die member than the first position, to thereby cause the filter material to be accumulated to the prescribed thickness on the outer peripheral surface of the first molding die member as the water slurry is sucked through the first molding die, and thereafter moves the second molding die member from the second position to the first position and further causes the filter material to be accumulated between the first and the second molding die members to thereby form the number of the concavities and convexities on the outer peripheral surface of the molded body.

2. The method as set forth in claim 1, wherein after a prescribed time period lapses from the start of the suction of the slurry, the second molding die member is moved from the second position to the first position.

3. The method as set forth in claim 1, wherein after the filter material accumulated on the first molding die member reaches 10 to 70% of a whole of the filter material to be accumulated finally, the second molding die member is moved from the second position to the first position.

4. The method as set forth in claim 3, wherein after the filter material accumulated on the first molding die member reaches 20 to 40% of the whole of the filter material to be accumulated finally, the second molding die member is moved from the second position to the first position.

5. The method as set forth in claim 1, further comprising the steps of:

impregnating the molded body with a thermohardening resin dispersed in water; and drying the impregnated molded body.

6. The method as set forth in claim 1, further comprising the steps of:

mixing the molded body with a thermohardening resin dispersed in water to thereby impregnate the molded body with the thermohardening resin; and drying and hardening the impregnated molded body.

7. The method as set forth in claim 5, wherein positive charges are imparted to the thermohardening resin.

8. The method as set forth in claim 1, wherein the second molding die member has a retaining part and a plurality of movable parts movably retained by the retaining part so that the movable parts are moved from the second position to the first position.

9. The method as set forth in claim 8, wherein the movable parts are formed in leg shape extending longitudinally from the retaining part.

10. The method as set forth in claim 9, wherein the movable parts are moved to rock in a generally radial direction.

11. A method for manufacturing a filter element, the method comprising the steps of:

sucking a water slurry containing filter material through a first molding die member having a number of suction openings formed therein and having a plurality of concavities and convexities formed in an outer peripheral surface thereof;

moving a second molding die member to a position opposing the concavities of the first molding die member and spaced by a prescribed distance from the outer peripheral surface of the first molding die member when the filter material has accumulated to a prescribed thickness on the outer peripheral surface of the first molding die member during the sucking step, wherein:

the sucking step continues after said moving step so that a space between the first and second molding die members is filled with the filter material to form a molded body having a plurality of concavities and convexities on an outer peripheral surface thereof; and wherein before said moving step the sucking step is performed substantially free from any resistance to flow of the filter material caused by the second molding die member until the filter material is accumulated to the prescribed thickness.

12. The method as set forth in claim 11, wherein the prescribed thickness is 10–70% of an entire thickness of the filter material of the molded body to be formed.

13. The method as set forth in claim 11, wherein the prescribed thickness is 20–40% of an entire thickness of the filter material of the molded body to be formed.

14. The method as set forth in claim 11, wherein the second molding die member has a retaining part and a plurality of movable parts movably retained by the retaining part so that the movable parts are moved from a second position to a first position.

15. The method as set forth in claim 11, wherein the second molding die member has a plurality of openings through which the filter material flows.

16. The method as set forth in claim 11, wherein the prescribed thickness is less than the prescribed distance.

17. A method for manufacturing a filter element comprising the steps of:

providing a first molding die member having an outer peripheral surface defining a plurality of concavities and convexities and having a plurality of suction openings formed in said outer peripheral surface;

providing a second molding die member movable between a first position opposing said concavities of said first molding die member and spaced by a prescribed distance from said outer peripheral surface of said first molding die member and a second position more remote from said outer peripheral surface of said first molding die member than said first position;

disposing said second molding die member in said second position;

sucking a water slurry containing filter material through said suction openings of said first molding die member;

accumulating said filter material to a prescribed thickness on said outer peripheral surface of said first molding die member during said sucking step, while said second molding die member is disposed in said second position, whereby said sucking step and said accumulating step are performed substantially free from any resistance to flow of said filter material caused by said second molding die member;

moving said second molding die member to said first position;

further sucking said water slurry containing filter material through said first molding die member and further accumulating said filter material after said moving step so that a space between said first and second molding die members is filled with said filter material thereby to form said filter element.

18. The method as set forth in claim 17, wherein said prescribed thickness is 20–40% of an entire thickness of said filter material to be formed.

19. The method as set forth in claim 17, wherein said second molding die member has a retaining part and a plurality of movable parts movably retained by said retaining part so that said movable parts are moved from the second position to said first position.

20. The method as set forth in claim 17, wherein said prescribed thickness is less than said prescribed distance.

* * * * *